F. E. & H. E. ESTABROOK.
J. F. ESTABROOK, EXECUTRIX OF F. E. ESTABROOK, DEC'D.
AUTOMATIC PIN SETTING MACHINE.
APPLICATION FILED JUNE 11, 1917.

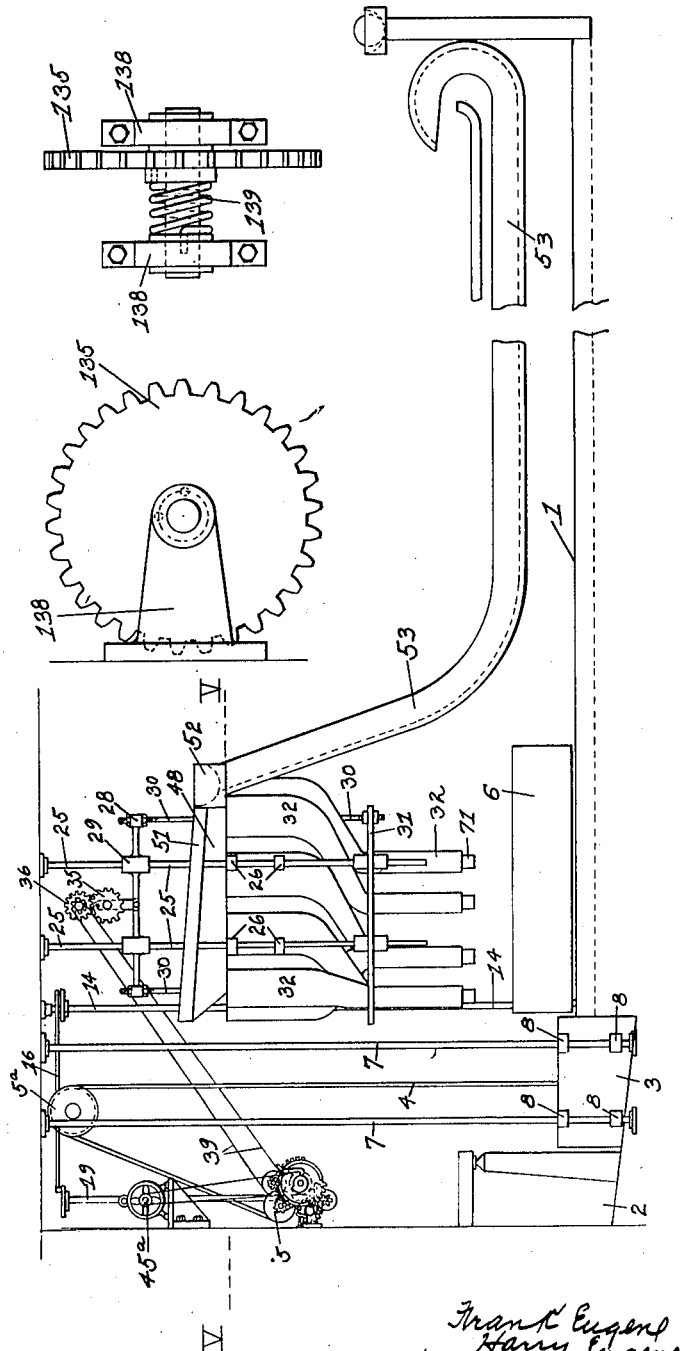

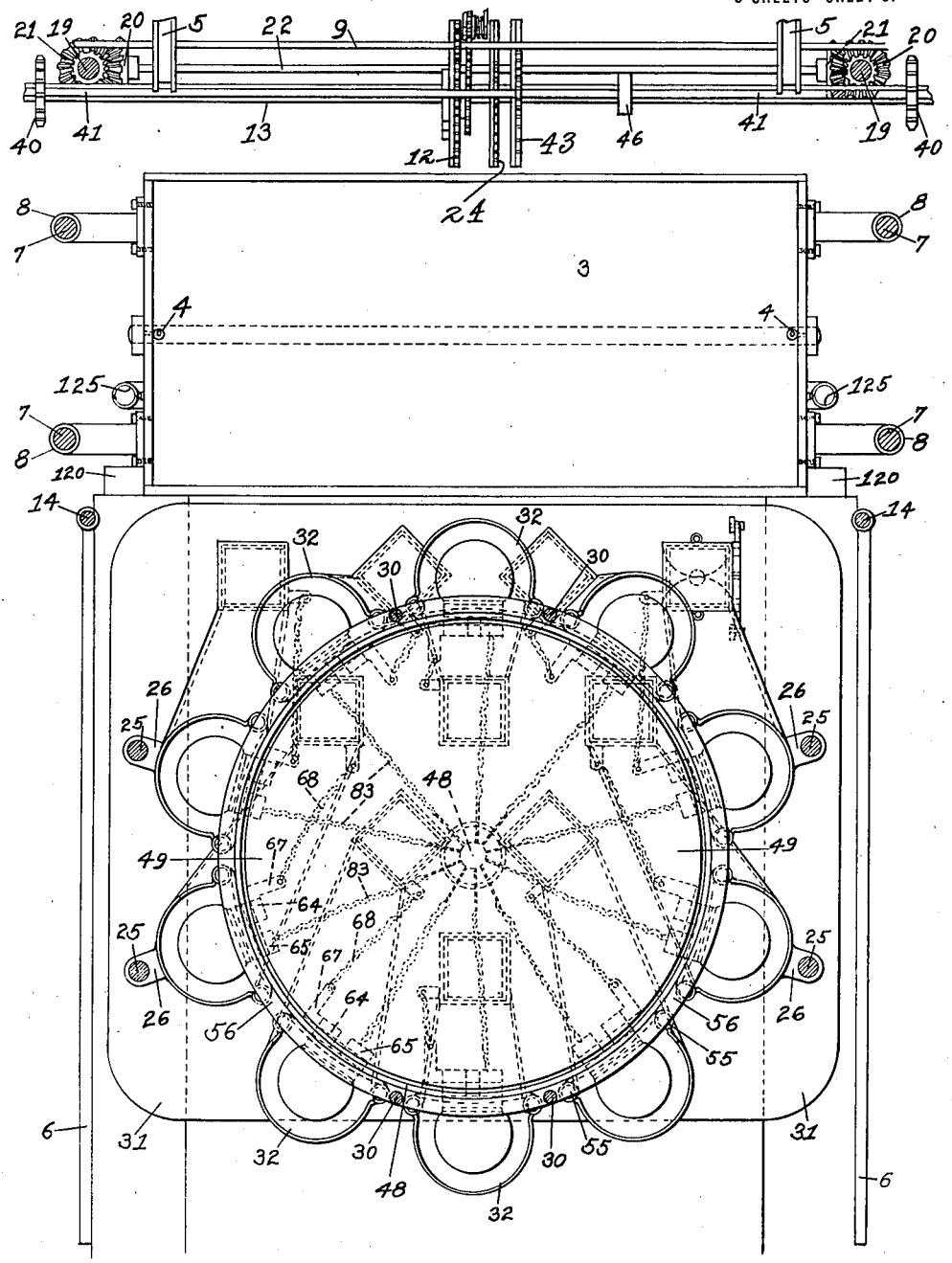

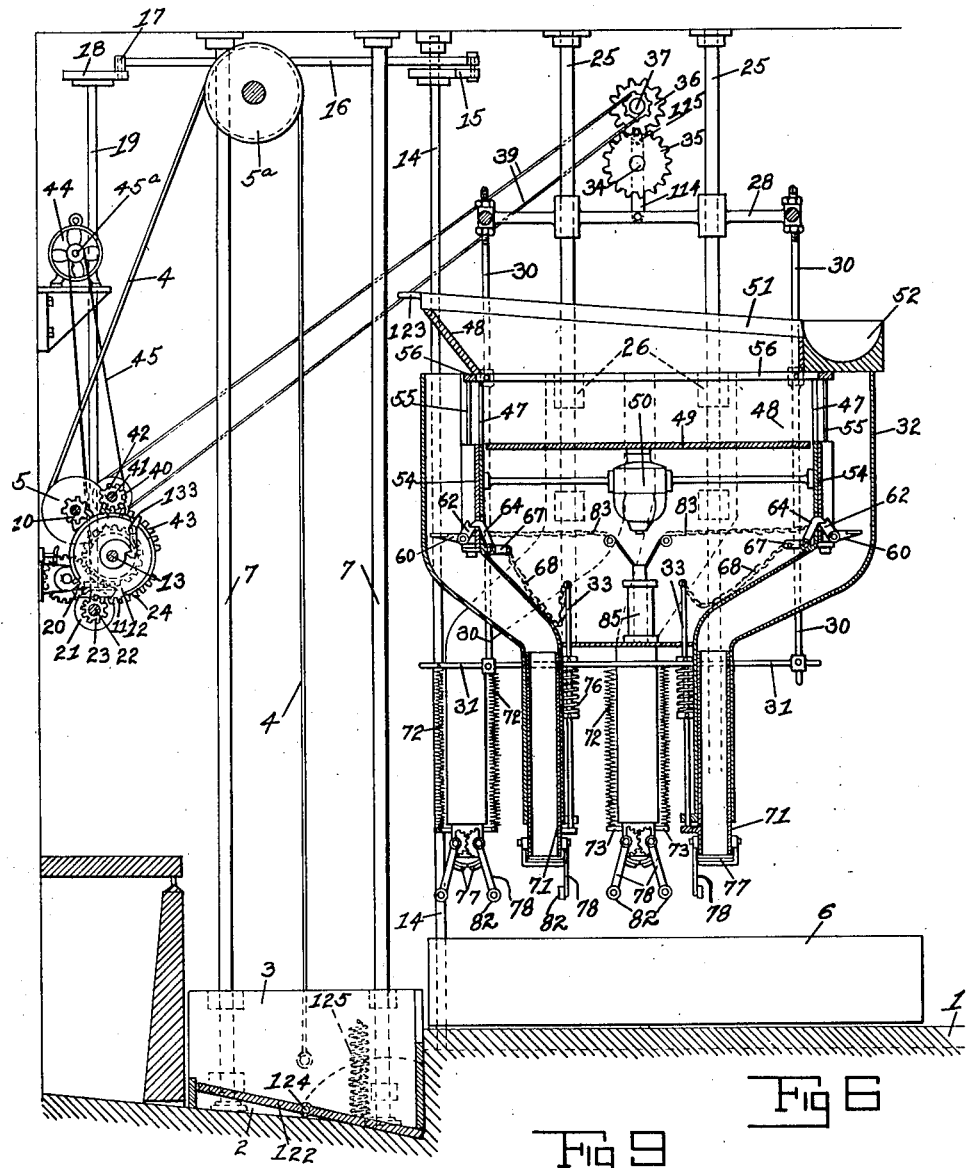
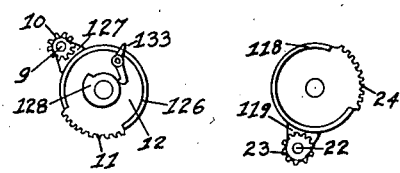

1,292,738.

Patented Jan. 28, 1919.
8 SHEETS—SHEET 5.

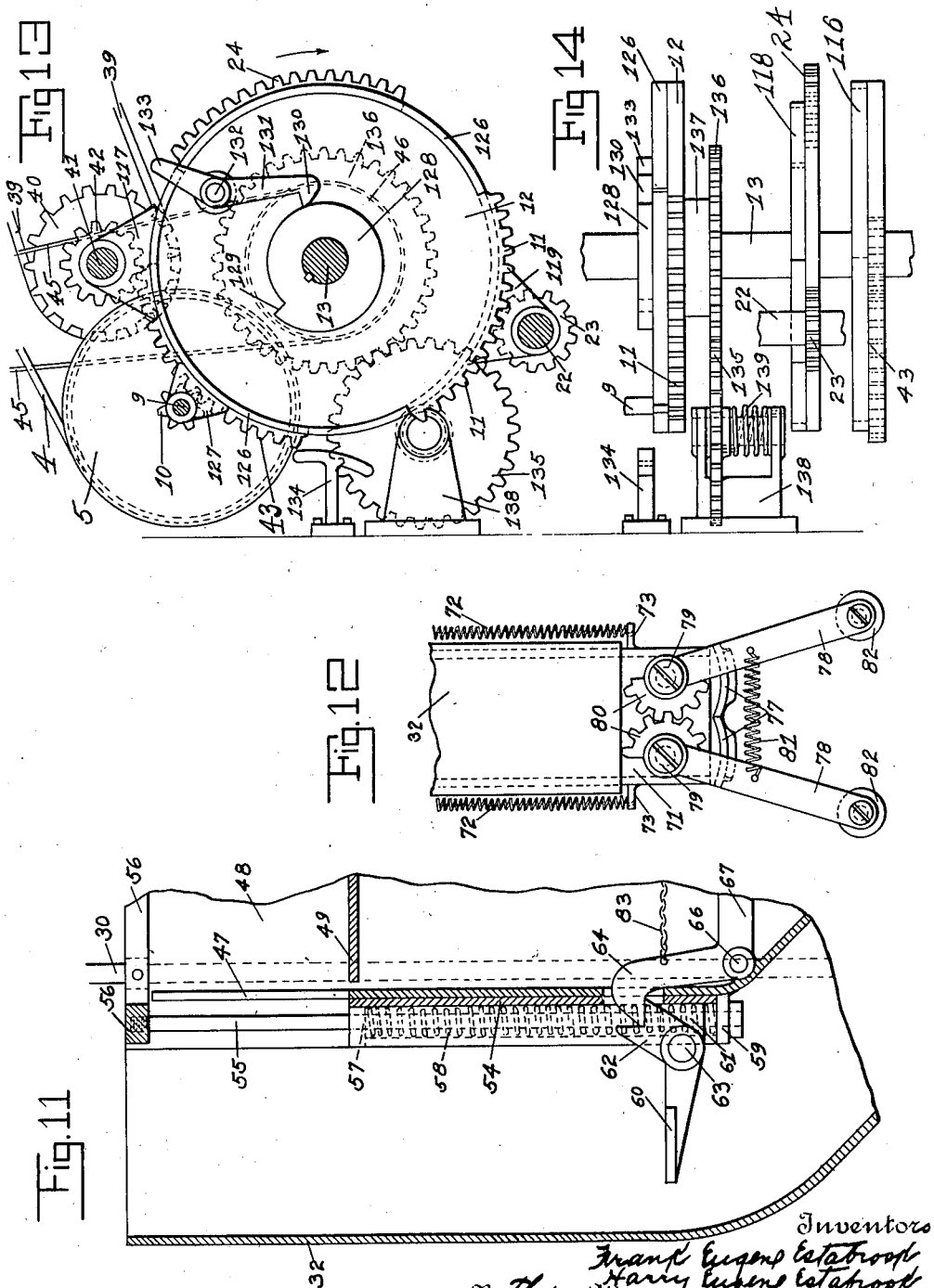

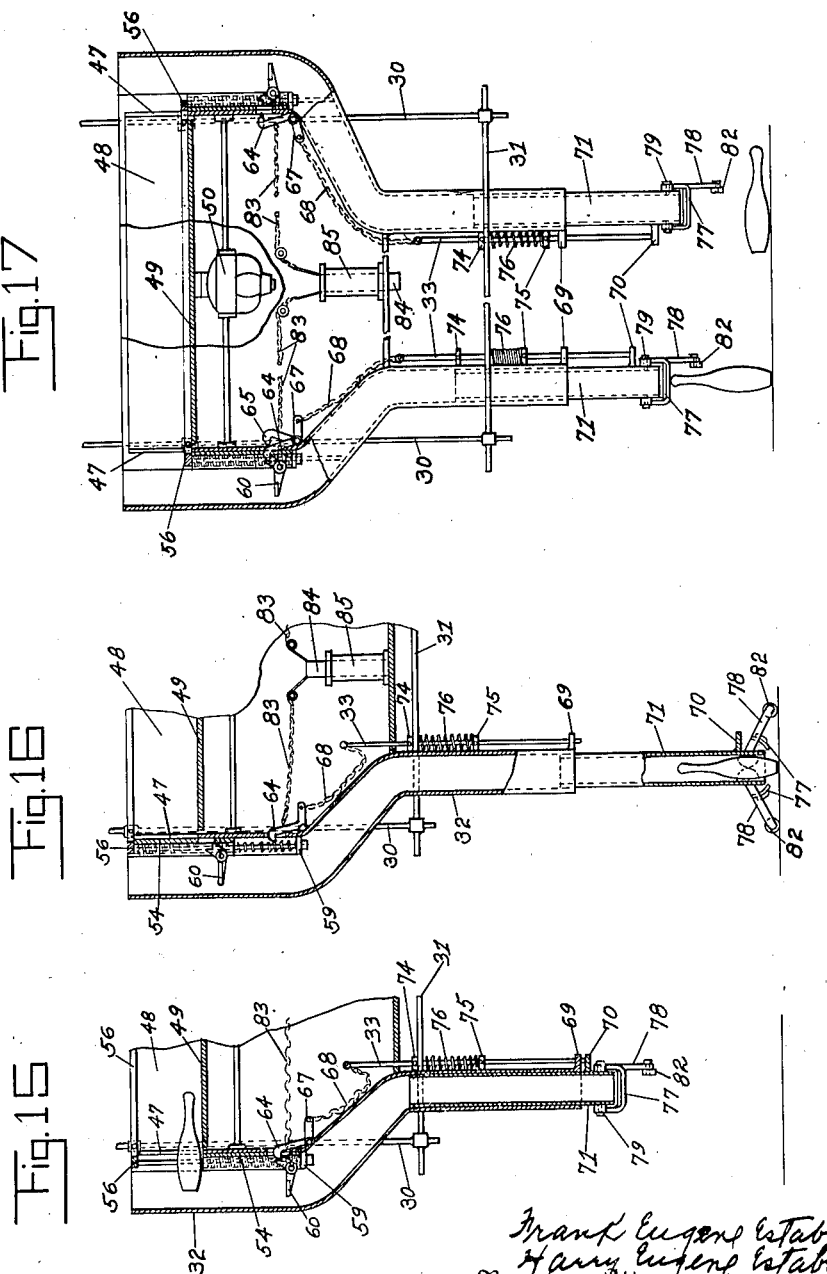

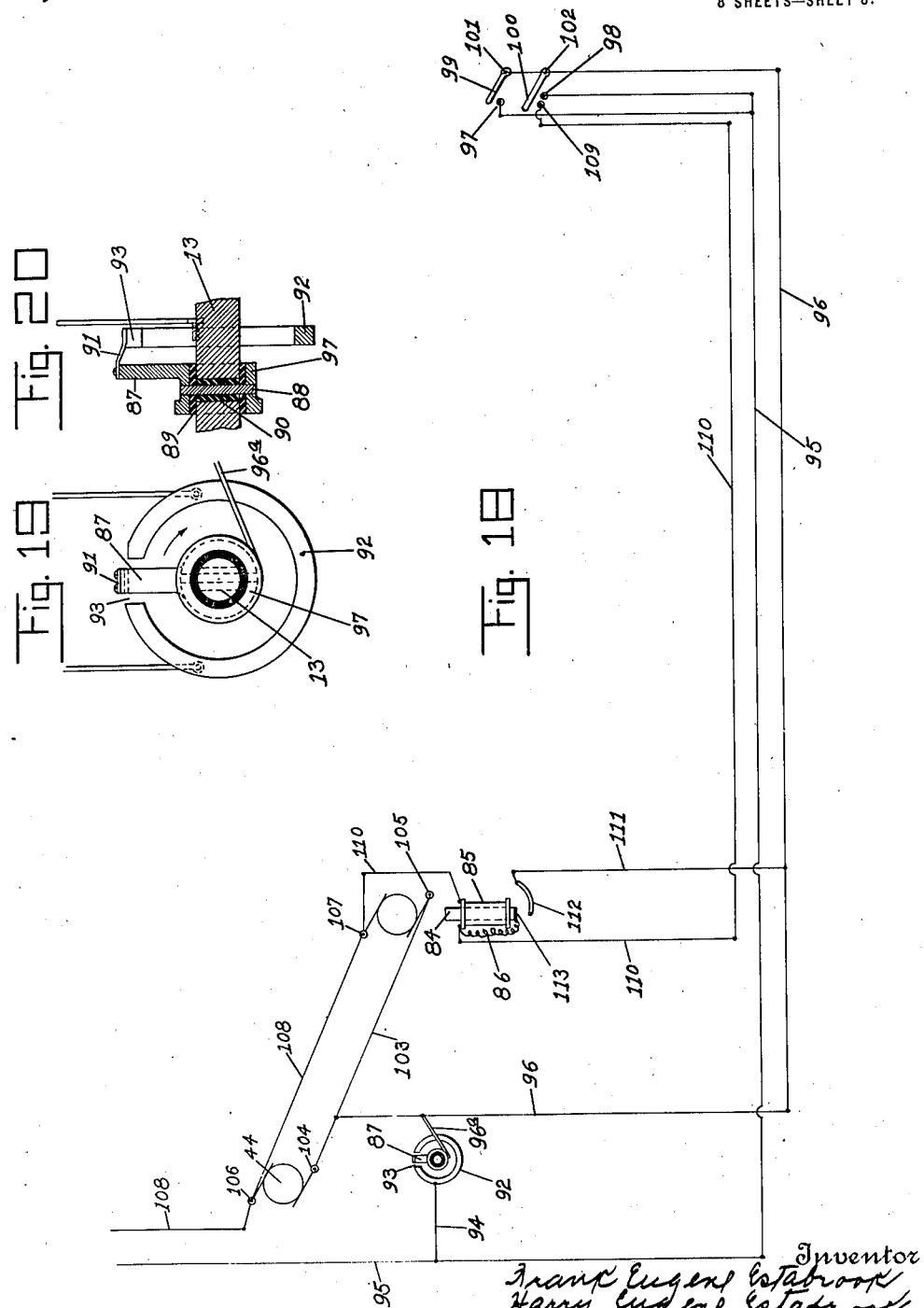

UNITED STATES PATENT OFFICE.

FRANK EUGENE ESTABROOK AND HARRY E. ESTABROOK, OF NEWBURGH, NEW YORK; JESSIE F. ESTABROOK, EXECUTRIX OF SAID FRANK E. ESTABROOK, DECEASED.

AUTOMATIC PIN-SETTING MACHINE.

1,292,738. Specification of Letters Patent. Patented Jan. 28, 1919.

Application filed June 11, 1917. Serial No. 173,978.

*To all whom it may concern:*

Be it known that we, FRANK EUGENE ESTABROOK and HARRY EUGENE ESTABROOK, citizens of the United States, and residents of Newburgh, county of Orange, and State of New York, have invented certain new and useful Improvements in Automatic Pin-Setting Machines, of which the following is a specification.

This invention relates to automatic pin setting machines for bowling alleys, and has for its object the provision of mechanism under the control of the player for setting the pins upon the alley, returning the balls to the player's position and removing the dead wood from the alley.

In the drawings, Figure 1 is a side elevation of an automatic pin setting machine, embodying the invention, showing the machine in position upon a bowling alley;

Figs. 2 and 3 are detail views of a portion of the gearing for the elevating mechanism;

Fig. 5 is a horizontal sectional view on the line V—V of Fig. 1;

Fig. 6 is a vertical sectional view, showing the parts in normal position;

Fig. 7 is a detail view of a portion of the gearing for actuating the elevating mechanism;

Fig. 8 is a detail view of the gearing for actuating the dead wood removing mechanism;

Fig. 9 is a detail view of the gearing for actuating the mechanism for setting the pins upon the alley;

Fig. 11 is a detail vertical sectional view through one of the pin depositing chutes, the cut-off gate being shown in open position;

Fig. 12 is a detail side elevation, showing the mechanism at the lower end of one of the pin setting chutes;

Figure 4:
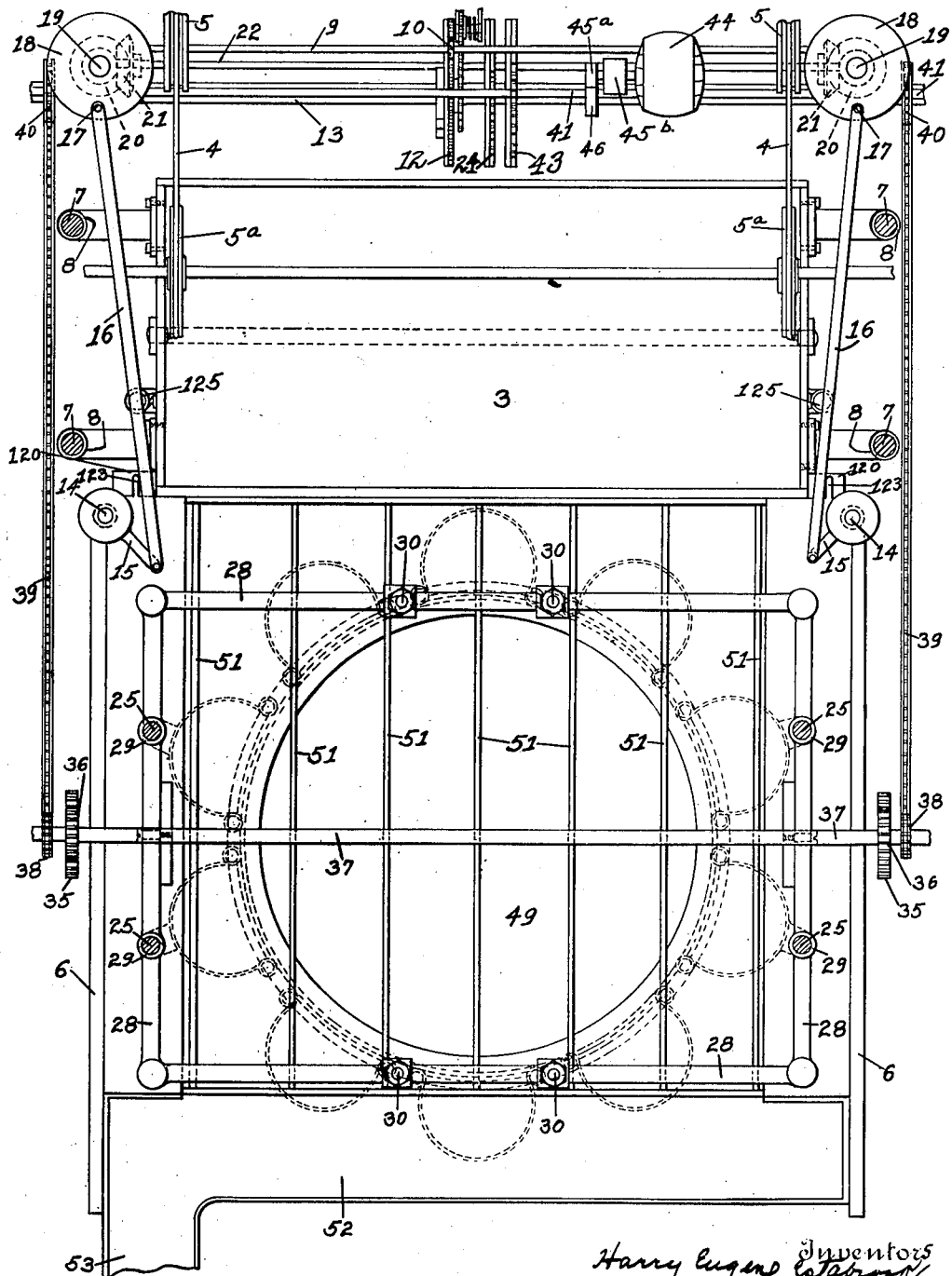
Fig. 4 is a plan view of the machine, portions of the mechanism being broken away.

Fig. 13 a side elevation showing the gearing for actuating the machine;

Fig. 14 a bottom plan view of the actuating gearing;

Fig. 15 a detail vertical sectional view through one of the pin depositing chutes, showing the parts in the position occupied at the beginning of the pin-depositing operation;

Fig. 16 a similar view showing the position of the parts as the pin is deposited upon the outer bed;

Fig. 17 a detail view partly in vertical section, showing the manner of setting the machine to respot the standing pins on the dead-wood removal operation;

Fig. 18 a diagram of the motor circuits; and

Figs. 19 and 20 detail views of the automatic circuit breaking device.

The automatic pin-setting machine is located at the pit end of the alley, which may be constructed in any suitable manner, and is formed with the usual alley bed 1 and alley pit 2.

The ball and pin elevating receptacle 3 is suspended on suitable cables 4 passing over loose pulleys 5ª and wound upon drums 5. The receptacle 3 normally rests on the bottom of the pit 2 in position to receive the balls and pins knocked from the alley or removed therefrom by the dead-wood removing sweeps 6. The elevating receptacle 3 is guided vertically by four vertical posts 7, the receptacle 3 being provided with suitable laterally projecting brackets at each side thereof formed with sleeves 8 embracing said posts. The drums 5 are fixed to a shaft 9 which may be journaled in any suitable support. A pinion 10 fixed on the shaft 9 is adapted to mesh with the toothed portion 11 of a mutilated gear 12 loosely held on the main shaft 13.

The dead-wood removing sweeps 6 are fixed at their rear ends to shafts 14 journaled in suitable bearings at their upper and lower ends. A crank arm 15 is rigidly held to each of the shafts 14 adjacent the upper ends of the shafts, and the free ends of said crank arms are connected by links 16 to crank pins 17 fixed on rotatable disks 18 mounted on shafts 19. The shafts 19 are supported in any suitable bearings and are provided at their lower ends with beveled pinions 20 meshing with beveled gears 21 fixed on the shaft 22. A pinion 23 fixed on the shaft 22 is adapted to be meshed with the toothed portion of the mutilated gear 24 fixed on the main shaft 13.

The mechanism for separating the balls and pins and setting the pins is suspended from a ceiling or other suitable over-head support by four vertically depending rods 25, the frame of the separating and depositing mechanism being rigidly held to said rods by suitable brackets 26. A vertically, reciprocable, rectangular frame 28 is slidably guided on said rods 25 by sleeves 29. Two pairs of vertical rods 30 are rigidly held at their upper ends at opposite sides of the frame 28. A horizontal plate 31 is rigidly held to the lower ends of the rods 30. The plate 31 is provided with suitable apertures through which the pin depositing chutes 32 extend. The plate 31 is also provided with apertures through which the rods 33 pass. The mechanism for reciprocating the frame 28 to operate the pin-depositing mechanism as hereinafter described, comprises a shaft 34 rotatably journaled in any suitable support and having fixed thereto two pinions 35, meshing with pinions 36 fixed on a shaft 37. The shaft 37 has fixed thereto two sprockets 38 driven by chains 39 from sprockets 40 fixed on a shaft 41. Pinion 42 fixed on the shaft 41 is adapted to mesh with the toothed portion of a mutilated gear 43 fixed on the main shaft 13.

The upper ends of the pin-depositing chutes are arranged in a circle, as shown more clearly in Fig. 5, and are provided at their inner sides with openings 47 communicating with the lower end of a hopper 48 having a revoluble bottom plate 49 adapted to be rotated by an electric motor 50. An inclined grid extends across the upper end of the hopper 48. This grid comprises a series of parallel rods or bars 51 inclined downwardly to the edge of a trough 52 communicating with a ball-return track or chute 53 extending along the side of the alley to the player's position. The rods 51 are spaced apart sufficiently to permit the pins discharged upon the grid from the elevating receptacle 3 to drop through the grid into the hopper 48, but are sufficiently close together to prevent the passage of the balls therebetween. The balls roll down the inclined grid into the trough 52 and thence to the player's position through the ball-return chute 53.

The openings 47 are normally closed by vertically reciprocable gates 54 slidably held at each side on rods 55 depending from a ring 56 rigidly held to the rods 30 carried by the reciprocating frame 28. The edges of the gates 54 are rolled to form tubular guides slidably held on the rods 55, the upper ends of said tubes being closed by plugs 57 rigidly held therein and provided with apertures through which the rods 55 extend. The gates are normally held in raised or closed position by coil springs 58 coiled around the rods 55 within the tubular guides and interposed between the plugs 57 and lugs 59 formed on the inner walls of the chutes 32. The gates are adapted to be opened simultaneously by the ring 56 and automatically locked in open position. When the ring 56 is depressed on a downward movement of the frame 28 and rods 30, the under side of the ring engages the closed upper ends of the tubular guides and forces all of the gates downwardly against the pressure of the springs 58, until the gates reach the position shown in Fig. 11. Each of the gates is provided with a bell-crank trip lever 60 pivotally held to lugs 61 formed at the lower ends of the gates. The notched upwardly extending arms 62 of the trip levers 60 are normally held in the position shown in Fig. 11, through the medium of a concealed spring in the pivot 63 of each trip lever, and when the gates are depressed the notched end of the arm 62 of each trip lever snaps under the hooked ends of a pair of pivoted latches 64 and 65 pivotally held at 66 to the chutes 32 and normally held in the position shown in Fig. 11 by concealed springs in the pivots 66.

Figure 10:
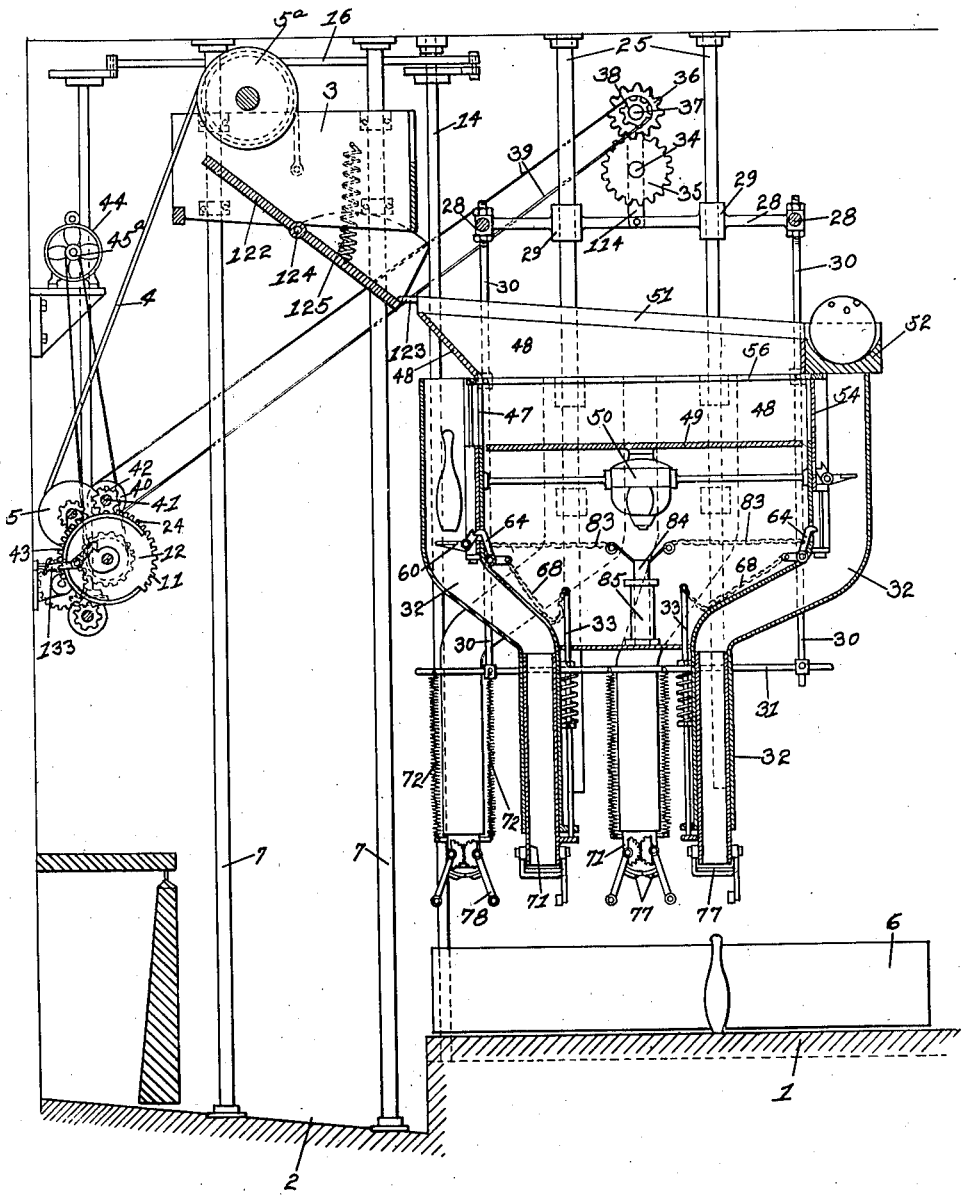
Fig. 10 is a vertical sectional view of the machine, showing the parts in the position occupied while the pins are being set.

The latches 64 are provided with inwardly extending arms 67 connected by chains 68 to the upper ends of the rods 33. The lower ends of the rods 33 extend through apertures in lugs 69 formed on the lower ends of the chutes 32 and bear against the upper surfaces of lugs 70 formed adjacent to the lower end of tubes 71 slidably held within the lower ends of the chutes 32. The tubes 71 are normally held telescoped within the chutes 32 as shown in Figs. 6, 10 and 12, by means of light coil springs 72 connected at one end to lugs 73 formed on the lower ends of the tubes 71, and held at their other ends to the plate 31. Each of the rods 33 is provided with a pair of spaced collars 74 and 75. The collars 74 are fixed to the rods 33 at points above the plate 31, and the collars 75 are fixed to the rods 33 below the plate 31. Coil springs 76 are interposed between the collars 75 and the under side of the plate 31. The springs 76 are stronger than the springs 72, and when the plate 31 is depressed upon a downward movement of the frame 28 and the rods 30, the rods 33 will be forced downwardly through the medium of the plate 31, springs 76, and lugs 75, and will force the tubes 71 downwardly against the tension of the springs 72, as shown in Fig. 17.

The lower ends of the tubes 71 are normally closed by a pair of downwardly and outwardly swinging gates 77 carried by arms 78 pivotally held to the lower ends of the tubes on horizontal pivots 79. The arms 78 are formed with intermeshing segments 80 at their upper ends, and are normally forced inwardly toward each other by coil springs 81. At their lower ends the arms 78 are provided with rollers 82 adapted to engage the alley bed when the tubes 71 move downwardly to the position shown in Fig. 13

16. The latches 64 are withdrawn from engagement with the arms 62 of the levers 60, through the medium of the chain 68 and rods 33 when the lower ends of the tubes 71 are forced downwardly to a point below the plane of the upper end of a standing pin, as shown at the right in Fig. 17, for a purpose hereinafter described. The latches 65 are connected by chains 83 with the upper end of the core 84 of a solenoid 85. The core of the solenoid is normally held in raised position by the tension of the springs in the pivot bearings of the latches 65 and is adapted to be pulled downwardly when the solenoid is energized to withdraw the latches 65 from engagement with the notched ends 62 of the levers 60, as shown in Fig. 17, for a purpose hereinafter described.

The main shaft 13 is adapted to be rotated through one revolution at each operation, by an electric motor 44, the main shaft being driven through a sprocket 46 fixed thereon and a sprocket chain 45 driven from a sprocket on the shaft 45ª driven from the shaft of the motor 44 through speed-reducing gearing 45ᵇ of any suitable construction. The circuits for controlling the motor 44 for driving the shaft 13, the motor 50 for rotating the bottom plate 49 of the hopper 48 and for controlling the solenoid 85, are shown diagrammatically in Figs. 18, 19 and 20. A rotary circuit controller 87 is keyed on the main shaft 13 by pin 88, the controller 87 and pin 88 being insulated from the main shaft by suitable sleeves 89 and 90 of insulating material. The circuit controller 87 is formed with the laterally extending resilient contact finger 91 adapted to slide over the outer surface of a circular contact member 92 extending about the main shaft 13 and supported in any suitable manner. The contact member 92 is cut away at 93 as shown in Figs. 18, 19 and 20, and is connected by wire 94 with the wire 95 forming one side of the main line of the motor circuit. The free end of a brush 96ª bears upon the hub 97 of the rotary circuit controller 87 and connects said controller with the wire 96 forming a part of the opposite side of the main line of the motor circuit. The wire 95 leads to the terminals 97 and 98 of the switches 99 and 100 located adjacent to the player's position. The switches 99 and 100 are preferably in the form of the well-known push-button switch. The terminal 101 of the switch 99 and the terminal 102 of the switch 100, are connected to the wire 96, the opposite end of the wire being connected to a branch line 103 connecting the brushes 104 and 105 at one side of the motors 44 and 50. The brushes 106 and 107 at the opposite side of the motors 44 and 50 are connected with the wire 108 forming a part of one side of the main line. The switch 100 is formed with a third terminal 109 connected by the branch line 110 with the main line 108 through the solenoid 85. A branch line 111 is connected at one end with the main line 96, and at its other end with a terminal 112 adapted to contact with an insulated terminal 113 carried by the lower end of the solenoid core 84 and insulated therefrom and electrically connected with one end of the wire 86, the opposite end of the wire 86 being electrically connected with the line 110.

To completely reset the alley after a player has finished rolling a set, the circuit is closed through lines 95, 108, motors 44 and 50 and line 96, by closing the switch 99, whereupon the motor 50 rapidly rotates the bottom plate 49 of the hopper 48 and the motor 44 begins to drive the main shaft 13 in the direction of the arrow indicated in Fig. 13. As the main shaft begins to rotate the brush 91 on the rotary circuit controller 87 moves through the dead space 93 into contact with the conducting ring 92, thus closing the circuit through the motors 44 and 50 by way of lines 95, 94, contact ring 92, brush 96ª, line 96, line 103, thence through the motors to line 108, whereupon the push-button switch 99 may be released and the circuit last described maintained through the motors 44 and 50 until the brush 91 on the rotary circuit controller 87 has made one complete revolution and again reaches the dead space 93, whereupon the circuit through the motors will be broken and the movement of the shaft 13 will cease after the shaft has made a single revolution. As the shaft 13 begins to rotate the teeth on the mutilated gear 43 engage the pinion 42 on the shaft 41, and, through the mechanism heretofore described, rotates the pinion 35 on the shaft 34 through a single revolution, and through the medium of a link 114 connected at its upper end to a crank pin 115 carried by the gear 35 and at its lower end to the frame 28, depresses and retracts the ring 56 and the plate 31. The depression of the ring 56 as heretofore described, simultaneously opens all of the gates 54 controlling the outlets 47 from the hopper 48, whereupon the gates are locked open by the latches 64 and 65, the gates thus being held down against the tension of the spring 58 when the ring 56 is retracted. The downward movement of the plate 31 forces the rods 33 downwardly in the manner heretofore described, causing an idle downward and upward movement of the tubes 71 and temporarily rocking the latches 64 out of engagement with the notched ends of the arms 62 of the trip levers 60. Since, however, the solenoid 85 is not energized the latches 65 always remain in engagement with the trip levers 60 and prevent the closing of the gates during the temporary unlatching of the latches 64. As the toothed portion of the gear 43 passes out of engagement with the pinion 42, a laterally extending flange 116 (see Fig. 9) formed integrally with the gear 43 engages the curved face of a segmental block 117 fixed on the shaft 41 adjacent to the pinion 42, thus positively locking the shaft 41 and the parts driven therefrom against movement during the remainder of the revolution of the main shaft 13.

Immediately upon the completion of the operation of the gate-setting devices just described, the toothed portion of the gear 24 fixed on the main shaft begins to mesh with the pinion 23 fixed on the shaft 22, and through the connections heretofore described, oscillates the shafts 14, causing the dead-wood removing sweeps 6 to move inwardly and rearwardly over the alley bed, thus sweeping all the pins and balls from the alley into the receptacle 3 resting at the bottom of the pit 2. One of the crank arms 15 for oscillating the shaft 14 is slightly shorter than the other, whereby one of the sweeps is moved inwardly slightly in advance of the opposite sweep to permit the sweeps to move inwardly in over-lapped relation without interference with each other. The toothed portion of the gear 24, through the gearing heretofore described, imparts a single revolution to the disk 18, thus causing a single inward and outward movement of the sweeps 6. As the toothed portion of the gear 24 passes out of engagement with the pinion 23, an inwardly extending flange 118 carried by the gear engages the curved face of a segmental block 119 fixed on the shaft 22, thus locking the dead-wood remover actuating means against movement during the remainder of the revolution of the main shaft 13.

At the completion of the dead-wood removing means the toothed portion 11 of the gear 12 is carried into mesh with the pinion 10 on the shaft 9 of the winding drum 5, thus winding the cable 4 upon the drum and lifting the receptacle 3 containing the balls and pins until lugs 120 projecting laterally from the forward end of the pivoted bottom plate 122 of the receptacle 3 strikes projecting stops 123 fixed on the frame of the separating grid 51, and a further upward movement of the receptacle 3 causes the bottom plate 122 of the receptacle to rock about its pivot 124 as shown in Fig. 10, whereupon the balls and pins are discharged upon the grid 51, the pins falling through the grid into the hopper 48 and the balls rolling down the inclined grid into the trough 52 and thence into the ball-return 53. The pivoted bottom plate 122 of the receptacle 3 is normally held in closed position by means of strong coil springs 125. As the toothed portion 11 of the gear 12 passes out of engagement with the pinion 10 when the receptacle 3 reaches its uppermost position, a laterally extending flange 126 formed on the gear 12 moves into engagement with the segmental block 127 fixed on the shaft 9, thus locking the shaft 9 against rotation during the remainder of the rotation of the main shaft 13 and holding the receptacle 3 in its uppermost position for a sufficient length of time to permit all of the pins and balls to pass from the receptacle 3 to the separating grid 51. The gear 12 is loose on the main shaft 13 and is caused to rotate therewith in the direction of the arrow in Fig. 13 to wind the cable 4 on the drum, through the medium of a cam 128 keyed on the main shaft 13. The cam 128 has a shoulder 129 adapted to engage the hooked end 130 of a lever 131 pivotally held intermediate its ends at 132 to one face of the gear 12. The lever 131 has a concealed spring in its pivot bearing, normally forcing the hooked end 130 of the lever into engagement with the cam 128. The loose gear 12 is formed with a sleeve or hub portion 137 to which is fixed a gear 136 meshing with a gear 135 journaled in brackets 138 held to the wall or other suitable support. A spring 139 is coiled about the shaft of the gear 135 and is fixed at one end to one of the brackets 138 and at its other end to the gear 135, so that as the gear 12 is rotated by the main shaft 13, through cam 128 and latch lever 131, the spring 139 is wound up to store power to rotate the gear 12 in the reverse direction to release the holding block 127 from flange 126 on gear 12 and to lower the receptacle 3. Just before the main shaft 13 completes its revolution the arm 133 of the latch lever 131 strikes a stop 134 held to the wall or other suitable support, whereupon the hooked end 130 of the latch lever is rocked out of engagement with the shoulder 129 on the cam 128 and the gear 12 is rotated in the reverse direction by the spring-driven pinion 135 and gear 136 fixed on the hub 137 of the gear 12 to release the holding block 127 from the flange 126, whereupon the receptacle 3 is lowered to the pit and the gear 12 continues its reverse movement until it reaches its starting point.

The pins falling on the revolving plate 49 are thrown outwardly by the centrifugal action of the plate, and by reason of the fact that the butt ends of the pins are heavier than the upper ends, the pins are discharged through the openings 47, butt end first as shown in Fig. 15. The distance from the perimeter of plate 49 to the outer walls of the chutes 32 is such that, in case a pin should pass head first through one of the openings 47, the head of the pin would engage the wall of the chute before the center of gravity of the pin could pass the edge of plate 49, thus preventing the pin from dropping into the chute. The revolving plate would then carry the butt end of the pin along and withdraw the head of the pin from the opening 47.

When a pin passes through one of the openings 47, butt end first and starts to fall downwardly through the adjacent chute 32, the bottom of the pin strikes the projecting arm of the trip lever 60 and rocks the notched arm 62 of the trip lever out of engagement with both of the latches 64 and 65, whereupon the gate is instantly closed by the coil springs 58, thus preventing the passage of more than one pin into a chute. As the pin passes downwardly through the chute it engages the gates 77 carried by the swinging arms 78 at the lower ends of the tubes 71, and the weight of the pin thereupon causes the tube 71 to move downwardly against the tension of the light springs 72 until the rollers 82 on the lower ends of the arms 78 engage the alley bed. A further downward movement of the tube 71 spreads the arms 78 apart against the tension of the spring 81 as shown in Fig. 16, thus opening the gates 77 and permitting the pin to pass through the lower end of the tube 71 onto the alley bed. As the gates 77 are moved outwardly from beneath the lower end of the pin the springs 72 retract the tube 71, and as the tube moves upwardly to its telescoped position the springs 81 pull the arms 78 toward each other, thus causing the inner edges of the gates 77 to contact with opposite sides of the pin and center the pin to properly spot the same on the alley bed. The intermeshing segments 80 carried by the upper ends of the arms 78 insure a simultaneous and equal movement of the arms 78 and gates 77, thus properly positioning the pin and maintaining the same in an upright position as the tube 71 is retracted by the springs 72.

To remove the dead wood and respot the live pins the switch 100 is operated to close the circuit through line 95, line 96, line 103, motors 44 and 50 to line 108, thus energizing the motors 44 and 50 to set the revolving plate 49 and the main shaft 13 in operation. A circuit is also closed through the terminal 109, line 110, solenoid 85 to the line 108, thus energizing the solenoid and pulling the core 84 thereof downwardly as shown in Fig. 17, thus releasing all of the latches 65 through the medium of the chains 83. As the main shaft begins to rotate the circuit is closed through the line 95, line 94, contact ring 92, rotary circuit controller 87, brush 96ª, line 96, line 103, through the motors 44 and 50 to line 108 to energize the motors until the shaft 13 has made one revolution as described in connection with the complete resetting operation above described. The movement of the rotary circuit controller 87 establishes a circuit through the solenoid 85 by way of brush 96ª, line 96, line 111, terminal 112, wire 86, thence through the solenoid winding to line 108 through line 110, thus holding the solenoid core down against the tension of the spring-pressed latches 65 throughout the revolution of the main shaft 13. The gate-opening means, the dead-wood removing means and the elevating means, are thereupon operated in succession, in the manner above described, through the main shaft 13. It will be seen, however—that when the plate 31 is moved downwardly by the rod 30 and frame 28 to force the tubes 71 downwardly in the manner heretofore described, the gates 77 carried by the tubes 71 leading to spots occupied by standing pins will engage the heads of the pins and prevent further downward movement of the tubes, the springs 76 compressing as shown at the left in Fig. 17 to permit relative movement between the plate 31 and the rods 33, acting on tubes contacting with standing pins. When the downward movement of a tube 71 is stopped by a standing pin a sufficient downward movement of the corresponding rod 33 to release the corresponding latch 64 is prevented, as shown at the left in Fig. 17, thus holding the gate leading to said tube in open position when the ring 56 is retracted. The latches 64 controlling the gates to chutes leading to spots previously occupied by fallen or dead pins are rocked out of engagement in the manner heretofore described in connection with the idle operation of these latches in the complete resetting operation, and in view of the fact that all of the latches 65 are held out of engagement with the trip levers 60 by the solenoid 85, the gates 54 to said chutes will move upwardly under the influence of their springs 58 as the ring 56 is retracted, thus closing the entrance to said chutes previously to the discharge of pins into the hopper 48. When pins are delivered into the hopper by the elevating mechanism, as heretofore described, it will be seen that pins will be discharged only into chutes leading to spots previously occupied by standing pins, the remainder of the pins being retained in the hopper 48.

What we claim is:

1. A pin-setting machine for a bowling alley, comprising means for setting the pins upon the alley bed, an inclined grid supported above the alley for separating the pins and balls, means supported under the grid for receiving the pins passing through said grid and delivering the same to the pin-setting means, a ball return chute having a portion extending along the lower edge of said grid adapted to receive the balls from the inclined grid, and means for elevating the pins and balls from the alley pit and depositing them upon said grid.

2. A pin-setting machine for a bowling alley, comprising means for setting the pins upon the alley bed, an inclined grid supported above the alley for separating the pins and balls, means supported under the grid for receiving the pins passing through said grid and delivering the same to the pin-setting means, a ball return chute having a portion extending along the lower edge of the grid adapted to receive the balls rolling from the inclined grid, means for removing pins and balls from the alley bed into the pit, and means for elevating the pins and balls from the alley pit and depositing them upon said grid.

3. In a pin-setting machine for a bowling alley, the combination of means for setting pins upon the alley bed, means for taking pins from the alley pit and delivering them to said setting means, and means for removing the standing and fallen pins from the alley bed into the alley pit, said pin-setting means being operable to set pins on the spots previously occupied by the standing pins or to set all of the pins in proper position on the alley bed.

4. In a pin-setting machine for a bowling alley, the combination of means for removing the standing and fallen pins from the alley bed, means for setting the pins in position on the alley bed, means for conveying all the pins to the setting means, and means whereby said setting means is operable to set all of the pins or to reset pins only on the spots occupied by the standing pins displaced by the pin-removing means.

5. A pin-setting machine for a bowling alley, comprising a hopper having a revoluble bottom plate and a plurality of pin-discharge openings in its side walls, pin-setting chutes adapted to receive pins discharged through said openings and deposit the pins in upright positions upon the alley bed, cut-off gates adapted to close said openings, means for taking pins from the alley and delivering them into said hopper, means for rotating said bottom plate to cause the pins to pass through said openings into the chutes butt end first, and means for automatically closing each of said gates after the passage of a single pin through the opening controlled thereby.

6. A pin-setting machine for a bowling alley, comprising a hopper having a revoluble bottom plate and a plurality of pin-discharge openings in its side walls, pin-setting chutes adapted to receive pins discharged through said openings and deposit the pins in upright positions upon the alley bed, cut-off gates adapted to close said openings, means for taking pins from the alley and delivering them into said hopper, means for rotating said bottom plate to cause the pins to pass through said openings into the chutes butt end first, means for automatically closing each of said gates after the passage of a single pin through the opening controlled thereby, and means whereby the gates controlling the entrance to a selected chute or chutes may be closed prior to the passage of a pin therethrough.

7. A pin-setting machine for a bowling alley, comprising a hopper having a revoluble bottom plate and a plurality of pin-discharge openings in its side walls, pin-setting chutes adapted to receive pins discharged through said openings and deposit the pins in upright positions upon the alley bed, cut-off gates adapted to close said openings, means for taking pins from the alley and delivering them into said hopper, means for rotating said bottom plate to cause the pins to pass through said openings into the chutes butt end first, means for automatically closing each of said gates after the passage of a single pin through the opening controlled thereby, and manually controlled means for closing the gates at the entrance to chutes leading to spots originally occupied by dead pins.

8. In a pin-setting machine for a bowling alley, the combination of a plurality of chutes adapted to deposit pins in an upright position on the alley bed, means for taking the pins from the alley and delivering the same into said chutes butt end first, means for preventing the entry of more than one pin into each chute, and manually controlled means for preventing the passage of pins through chutes leading to spots originally occupied by dead pins, whereby the alley may be either completely or partially reset.

9. A pin-setting machine for a bowling alley, comprising a shaft, electrically controlled means for rotating said shaft through one revolution, a hopper having a plurality of pin-discharge openings, pin-setting chutes adapted to receive pins discharged through said openings and set the pins upon the alley bed, cut-off gates for said openings, yieldable means for normally holding said gates in closed position, means for taking pins from the alley and delivering them into said hopper, a rotary bottom plate in said hopper, means for rotating said plate to cause the pins to pass outwardly through said openings butt end first, means driven from said shaft for opening said gates, means for automatically locking the gates in open position, means driven from said shaft for actuating the pin delivering means, and means actuated by the pins for releasing said gates upon the passage of a single pin therethrough.

10. A pin-setting machine for a bowling alley, comprising a shaft, electrically controlled means for rotating said shaft through one revolution, a hopper having a plurality of pin-discharge openings, pin-setting chutes adapted to receive pins discharged through said openings and set the pins upon the alley bed, cut-off gates for said openings, yieldable means for normally holding said gates in closed position, means for taking pins from the alley and delivering them into said hopper, a rotary bottom plate in said hopper, means for rotating said plate to cause the pins to pass outwardly through said openings butt end first, means driven from said shaft for opening said gates, means for automatically locking the gates in open position, means driven from said shaft for actuating the pin delivering means, means actuated by the pins for releasing said gates upon the passage of a single pin therethrough, and means whereby the gates controlling a selected chute or chutes are automatically released from said locking means prior to the delivery of the pins into said hopper.

11. In a pin-setting machine, the combination of means for removing pins and balls from the alley bed, a hoisting receptacle adapted to receive the pins and balls removed from the alley bed, pin-spotting means, ball-returning means, means for separating the balls and pins adapted to deliver the pins to said pin-spotting means and the balls to said ball-returning means, means for raising and lowering said hoisting receptacle, and means for transferring the balls and pins from said receptacle to said separating means when the receptacle is elevated.

12. In a pin-setting machine, the combination of a hoisting receptacle, means for removing pins and balls from the alley into said receptacle, pin-spotting means, ball-returning means, pin and ball separating means located above the pin-spotting means and adapted to discharge the pins into the pin-spotting means and the balls into the ball-returning means, means for raising and lowering said hoisting receptacle, and means for automatically emptying the pins and balls in said receptacle upon the separating means when the receptacle is hoisted.

13. In a pin-setting machine, the combination of pin-spotting means supported above the alley bed, means for conveying pins from the alley pit to the pin-spotting means, manually-controlled power-operated means for elevating said conveying means, and means for automatically lowering said conveying means.

14. In a pin-setting machine, the combination of pin-spotting and ball-returning means supported above the alley, a hoisting receptacle, means for removing pins and balls from the alley into said receptacle, separating means located above the alley and adapted to deliver pins to the pin-spotting means and balls to the ball-returning means, manually-controlled power-operated means for hoisting said receptacle, means for dumping said receptacle to transfer the pins and balls therein to the separating means, means for holding the receptacle in its elevated position during dumping thereof, and means for automatically lowering said receptacle after the completion of the dumping operation.

15. In a pin-setting machine, the combination of pin-spotting means, an inclined grid located above the spotting means for separating the pins from the balls, a ball-return chute adapted to receive balls rolling from said grid, a hoisting receptacle having a pivoted bottom part, means for normally holding said bottom part in closed position, means for removing balls and pins from the alley into said receptacle, means for raising and lowering said receptacle, and means adapted to rock the bottom part of the receptacle about its pivots when said receptacle is raised to a position above said grid to dump the balls and pins upon the grid.

16. In a pin-setting machine, the combination of pin-spotting means, means for reciprocating said spotting means toward and from the alley bed, and means controlled by the reciprocatory movement of the pin-spotting means for controlling the number and positions of pins set by said spotting means.

17. In a pin-setting machine, the combination of pin-spotting means, means movable toward and from the alley bed adapted to engage standing pins to set the spotting means to place pins in the positions occupied by the standing pins engaged by said means, means operable subsequently to said setting means for removing all pins and balls from the alley and delivering all of said pins to the spotting means, and means for subsequently operating the spotting means to reset pins in the positions occupied by the standing pins removed by said pin and ball removing means.

18. In a pin-setting machine, the combination of devices movable toward and from the alley bed and each adapted to have the extent of movement thereof limited by engagement with a standing pin, means adapted to set pins upon the alley bed at the points toward which said devices are movable, means for removing all pins from the alley and delivering the same to the setting means, and means controlled by the extent of movement of said devices toward the alley bed whereby the pin-setting means is prevented from re-setting pins at points not previously occupied by standing pins removed by said pin-removing means.

19. In a pin-setting machine, the combination of devices movable toward and from the alley bed and each adapted to have the extent of movement thereof limited by engagement with a standing pin, means adapted to set pins upon the alley bed at the points toward which said devices are movable, means for removing all pins from the alley and delivering the same to the setting means, means controlled by the extent of movement of said devices toward the alley bed whereby the pin-setting means is prevented from resetting pins at points not previously occupied by standing pins removed by said pin-removing means, and means whereby said pin-setting means may be operated at will to re-set all of the pins.

20. In a pin-setting machine, the combination of means for removing both standing and fallen pins from the alley bed, ball-returning means, pin-spotting means, means for delivering all of the pins removed by said pin-removing means to the pin-spotting means, means whereby said spotting means may be operated to re-spot all of the pins displaced by said pin-removing means, and means whereby said spotting means may be operated at will to re-spot pins only on the positions previously occupied by standing pins displaced by said pin-removing means.

21. In a pin-setting machine, the combination of pin-spotting means embodying a plurality of chutes and means for setting pins delivered into said chutes in upright positions on the alley bed, centrifugal means for delivering pins butt end first into said chutes, and means for conveying pins from the alley to said centrifugal delivery means.

22. In a pin-setting machine, the combination of pin-spotting means embodying a plurality of chutes and means for setting pins delivered into said chutes in upright positions on the alley bed, centrifugal means for delivering pins butt end first into said chutes, means for conveying pins from the alley to said centrifugal delivery means, and means for preventing the delivery of more than one pin into each chute by said centrifugal means.

23. In a pin-setting machine, the combination of pin-spotting means embodying a plurality of chutes adapted to deposit pins in an upright position on the alley bed, centrifugal means for delivering pins butt end first into said chutes, means for removing both standing and fallen pins from the alley, means for conveying the pins to said delivery means, means for preventing the delivery of more than one pin to each chute, and means operable at will to prevent the delivery of pins to chutes leading to spots previously occupied by fallen pins, whereby the alley may be partly or wholly re-set at the will of the operator.

24. In a pin-setting machine, the combination of a driving shaft, means for rotating said shaft at will through a single revolution, pin-spotting means, means driven from said shaft for removing both standing and fallen pins from the alley, means driven from said shaft for distributing pins to the spotting means, means driven from said shaft whereby all the pins displaced by the pin-removing means are delivered to the distributing means, and means driven from said shaft operable at the will of the operator to set the spotting means to either completely re-set the alley or to re-set pins on the spots previously occupied by standing pins removed by said pin-removing means.

25. In a pin-setting machine, the combination of a plurality of spotting devices, means for delivering a single pin to each spotting device, means for removing both the standing and fallen pins from the alley and for conveying all of said pins to the delivery means, and means whereby the delivery of pins to the spotting devices leading to spots previously occupied by dead pins removed by said pin-removing means may be prevented at will.

26. In a pin-setting machine, the combination of a plurality of spotting devices, means for delivering a single pin to each spotting device, means for removing both the standing and fallen pins from the alley and for conveying all of said pins to the delivery means, a driving shaft, means whereby said shaft may be rotated through a single revolution at will, means driven from said shaft for operating the pin-delivering means, means driven from said shaft for operating the pin-removing means, and means driven from said shaft and operable at will to set the pin-delivering means to deliver pins to all of said spotting devices or to spotting devices adapted to replace pins on spots previously occupied by standing pins removed by said pin-removing means.

27. In a pin-setting machine, the combination of pin-spotting means supported above the alley bed, a hoisting receptacle for conveying pins from the alley pit to the pin-spotting means, power-operated means for hoisting said receptacle, means for automatically locking the recptacle in hoisted position, means for automatically dumping pins from the hoisted receptacle and discharging the same into the pin-spotting means, automatically controlled power-operated mechanism for releasing the receptacle-locking means, and means whereby power for actuating said releasing means is generated by the operation of the hoisting means.

This specification signed this 26th day of May, A. D. 1917.

FRANK EUGENE ESTABROOK.
HARRY E. ESTABROOK.